United States Patent
Selby

[15] 3,703,112
[45] Nov. 21, 1972

[54] MACHINE TOOL WITH BAR FEED CONTROL

[72] Inventor: Jack H. Selby, Chagrin Falls, Ohio

[73] Assignee: The Warner & Swasey Company, Cleveland, Ohio

[22] Filed: June 11, 1970

[21] Appl. No.: 45,476

[52] U.S. Cl. ............................82/2.5, 29/27, 214/1.1
[51] Int. Cl. .............................................B23b 13/02
[58] Field of Search............82/2.5, 2 B, 2.7; 214/1.1; 29/27

[56] References Cited

UNITED STATES PATENTS

| | | | |
|---|---|---|---|
| 3,486,209 | 12/1969 | Shultz et al. | 29/27 |
| 3,324,364 | 6/1967 | Caruthers | 82/2 B |
| 3,200,680 | 8/1965 | Coffin | 82/2.5 |
| 3,131,587 | 5/1964 | Spohn et al. | 82/2.7 |
| 3,101,019 | 8/1963 | LeLan | 82/2.5 |
| 489,935 | 1/1893 | Conradson | 214/1.1 |
| 3,448,280 | 6/1969 | Blitchington et al. | 82/2 B |
| 2,742,656 | 4/1956 | Fischer | 82/2.7 X |

*Primary Examiner*—Leonidas Vlachos
*Attorney*—Yount and Tarolli

[57] ABSTRACT

An improved machine tool for operating on bar stock includes a chuck for holding the bar stock with a leading end portion extending toward a work station and a trailing end portion extending in a direction away from the work station. Bar stock is fed from the chuck to the work station by a gripper assembly which pulls the bar stock out of the chuck. As the bar stock is fed to the work station, a signal generator provides signals representative of changes in the length of the trailing end portion of bar stock. To insure that sufficient bar stock is left in the chuck for proper holding during operation of the machine in response to signals from the signal generator indicating that the trailing end portion of the bar stock is shorter than a predetermined length. The numerical control system is activated by a bar end detector when the trailing end surface of the bar stock is in a predetermined location and a known length of bar stock is available for feeding to the work station.

30 Claims, 4 Drawing Figures

FIG. 2

INVENTOR
JACK H. SELBY

BY Yount and Tarolli
ATTORNEYS

MACHINE TOOL WITH BAR FEED CONTROL

This invention relates to an apparatus for interrupting the feeding of bar stock from a chuck to a work area when a trailing end portion of the bar stock is shorter than a predetermined length.

During operation of a machine tool, sections of bar stock are sequentially fed from a chuck to a work area. As sections of a given piece of bar stock are fed to the work area, the length of a tailing end portion of the piece of bar stock is reduced. The feeding of the bar stock must be interrupted before the trailing end portion is reduced to a length which is insufficient to enable the chuck to properly grip the piece of bar stock. Furthermore when a pull type bar feed is utilized, feeding of the bar stock must be interrupted before the trailing end portion of bar stock is pulled from the chuck. However, economical operation of a machine tool requires that the feeding of a piece of bar stock be continued when the trailing end portion of bar stock has sufficient length to enable the chuck to properly grip the bar stock on a next succeeding cycle of operation of the machine tool.

Accordingly, it is an object of this invention to provide a new and improved machine for operating on bar stock which is fed to a work area by pulling bar stock from a chuck and wherein the machine includes a control system for interrupting the feeding of bar stock when the trailing end portion of bar stock has a length which is shorter than a predetermined length to thereby prevent overfeeding of the bar stock.

Another object of this invention is to provide a new and improved machine for operating on bar stock with tools in a work area and including a chuck for holding the bar stock and feed means for feeding the bar stock from the chuck to the work area, wherein operation of the feed means is controlled by a numerical control system which includes means for storing data indicative of the length of bar stock available for feeding to the work area and means for interrupting operation of the feed means to prevent feeding operations after a feeding of a length of bar stock determined by the stored data.

Another object of this invention is to provide a new and improved machine for working on bar stock and which includes a chuck for holding the bar stock, a feed assembly for feeding bar stock to a work area, a detector for detecting when a trailing end surface of the bar stock is in a predetermined location and the trailing end portion of the bar stock has a predetermined first length, and wherein a control assembly is operable to render the feed assembly ineffective to move the bar stock through a distance which is greater than a predetermined distance to thereby prevent feeding of the bar stock when the trailing end portion of the bar stock is shorter than a predetermined second length.

Another object of this invention is to provide a new and improved machine for operating on bar stock with tools in a work area and wherein the machine includes a numerical control means which operates in dependency upon stored data and is operable to interrupt and prevent feeding operations after a feeding of a length of bar stock determined by the stored data.

Another object of this invention is to provide a new and improved machine for operating on bar stock in a work area in accordance with the next preceding object and wherein the machine includes a gripper for moving bar stock through a plurality of feed strokes to feed bar stock to the work area during operation of the machine and wherein the numerical control means includes means for storing data representative of the length of bar stock available for feeding, means for storing data in accordance with the length of bar stock to be fed on a next succeeding feed stroke, and control means which is effective to interrupt the feeding operation in response to the stored data when the length of bar stock available for feeding is less than the length of bar stock to be fed on a next succeeding feed stroke.

Another object of this invention is to provide a new and improved machine which is operable through a plurality of cycles to operate on successive sections of a piece of bar stock with tools at a work station wherein the machine includes a chuck for holding the piece of bar stock with a leading end portion extending from the chuck toward the work station and a trailing end portion extending in a direction away from the work station, a gripper movable through a feed stroke of a programmable length to sequentially feed the sections of bar stock to work station, and wherein a signal generator is provided for generating signals for determining the change in length of the trailing end portion of bar stock as the sections of bar stock are fed to the work station by movement of the gripper on successive cycles of operation of the machine and a control means is provided for stopping operation of the machine in response to one of the signals when the trailing end portion of bar stock is shorter than a predetermined length.

Another object of this invention is to provide a new and improved method of operating a machine for working on bar stock with tools located in a work area wherein this method includes the steps of holding the bar stock in a chuck, feeding bar stock to the work area, detecting when a trailing end surface of the bar stock is moved to a predetermined location relative to the chuck by the feeding of bar stock, moving the trailing end surface of the bar stock away from this predetermined location by continuing the feeding of bar stock, and interrupting operation of the machine when movement of the trailing end surface of the bar stock from the predetermined location exceeds a predetermined distance to thereby prevent feeding of the bar stock to the work area when the trailing end portion of the bar stock is shorter than a predetermined length.

Another object of this invention is to provide a new and improved method of operating a machine for working on bar stock with tools located in a work area wherein the method comprises the steps of holding the bar stock in a chuck, gripping the bar stock with a gripper, feeding bar stock to the work area by moving the gripper and bar stock relative to the chuck, generating signals for determining the change in the length of the trailing end portion of the bar stock during the feeding step, and stopping the feeding of bar stock in response to the signals when the length of the trailing end portion of bar stock is less than a predetermined length.

Another object of this invention is to provide a new and improved method of operating a machine for working on bar stock with tools located in a work area wherein the method includes the steps of providing coded data which determines the length of bar stock available to be fed to the work area, feeding bar stock to the work area, and stopping the feeding of bar stock and preventing further feeding operations upon feeding of the available length of bar stock as determined by the coded data.

These and other objects and features of the invention will become more apparent upon a consideration of the following description taken in connection with the accompanying drawings wherein:

Figure 1:
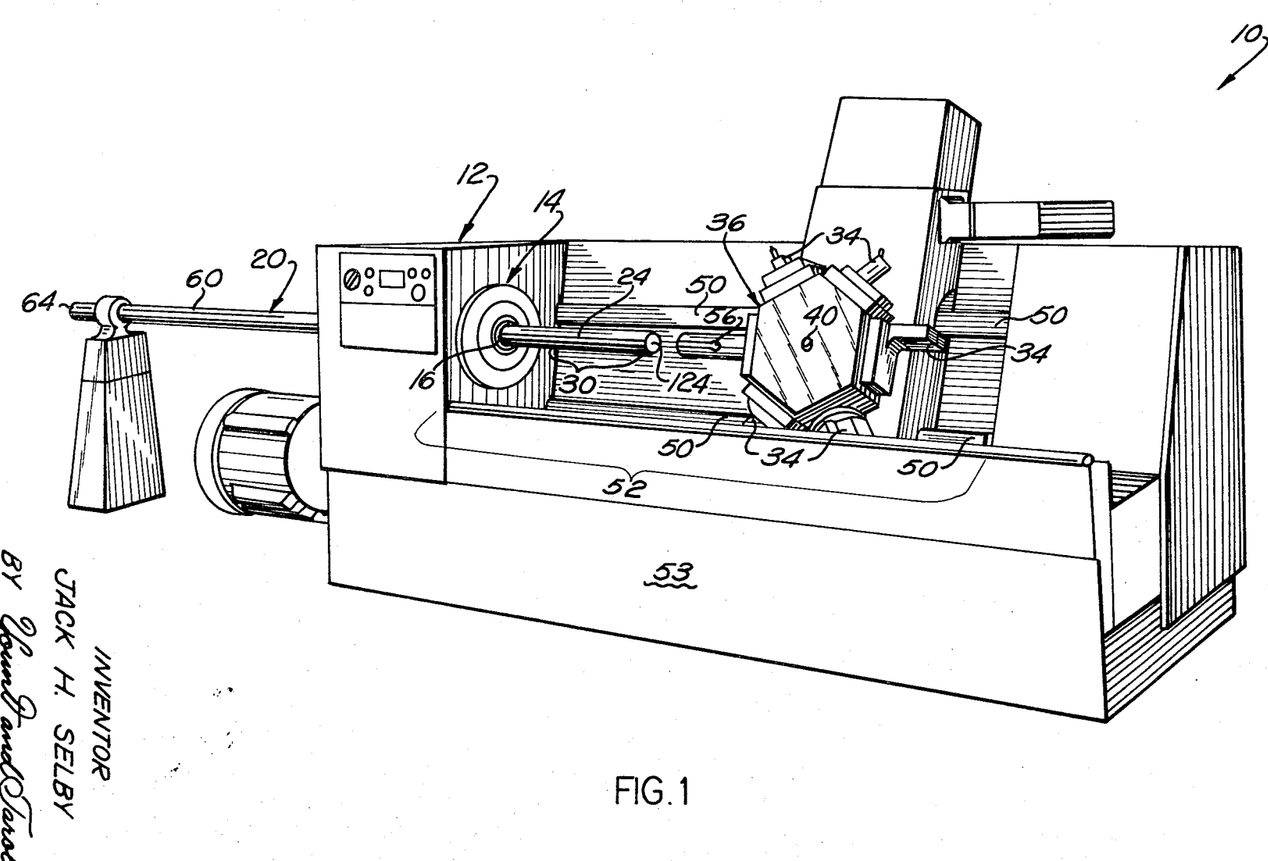
FIG. 1 is a schematic illustration of a machine tool having a bar stock feeding system in accordance with the present invention.

A machine tool 10 having a bar stock feeding apparatus constructed in accordance with the present invention is illustrated in FIG. 1. The machine tool 10 is a well known saddle-type turret lathe and includes a headstock 12 in which a spindle assembly 14 is mounted. Although the machine tool 10 is a turret lathe having only a single spindle assembly 14, it is contemplated that a bar feed apparatus constructed in accordance with the present invention could be used in multiple spindle machines and in machines other than turret lathes.

The spindle assembly 14 includes a collet chuck 16 having jaws for gripping and holding the bar stock 20 for rotation by the spindle assembly 14. An actuator assembly 22 (FIG. 2) operates the jaws of the chuck 16 between a closed condition in which the jaws securely grip the bar stock and an open condition in which the bar stock is released for axial movement relative to the spindle assembly 14. Although it is contemplated that many different types of spindle assemblies could be utilized, in a specific preferred embodiment of the invention the spindle assembly 14 is the same as disclosed in U.S. Pat. No. 2,546,326 to Wetzel. In order to avoid prolixity of description, the disclosure therein is hereby incorporated into this specification by this reference thereto.

The spindle assembly 14 is operable to rotate the bar stock 20 with a leading end portion 24 of the bar stock extending into a work or machining station 30 (FIG. 1) where it is machined in a known manner by tools 34 mounted on a turret 36. The turret 36 is rotatable about a center pivot 40 to index the various tools 34 to working positions relative to the leading end portion 24 of the bar stock 20. The turret 36 is mounted on a cross slide 42 (FIG. 2) for crosswise movement to position a selected tool 34 transversely relative to the bar stock 20. This transverse movement of the cross slide 42 is guided by ways or tracks 44 extending perpendicular to a longitudinal axis of the bar stock 20 and the spindle assembly 14. The ways 44 are mounted on a saddle or carriage 48 which is moved along bedways or tracks 50 in a work area 52 which extends away from the headstock 12 for substantially the entire length of a base 53 (FIG. 1) of the machine tool 10. By moving the saddle 48 along the bedways 50 which are parallel to the longitudinal axis of the spindle assembly 14, the position of the tools 34 can be adjusted longitudinally relative to the end portion of the bar stock 20 and the base 53 for the machine tool 10.

Figure 2:
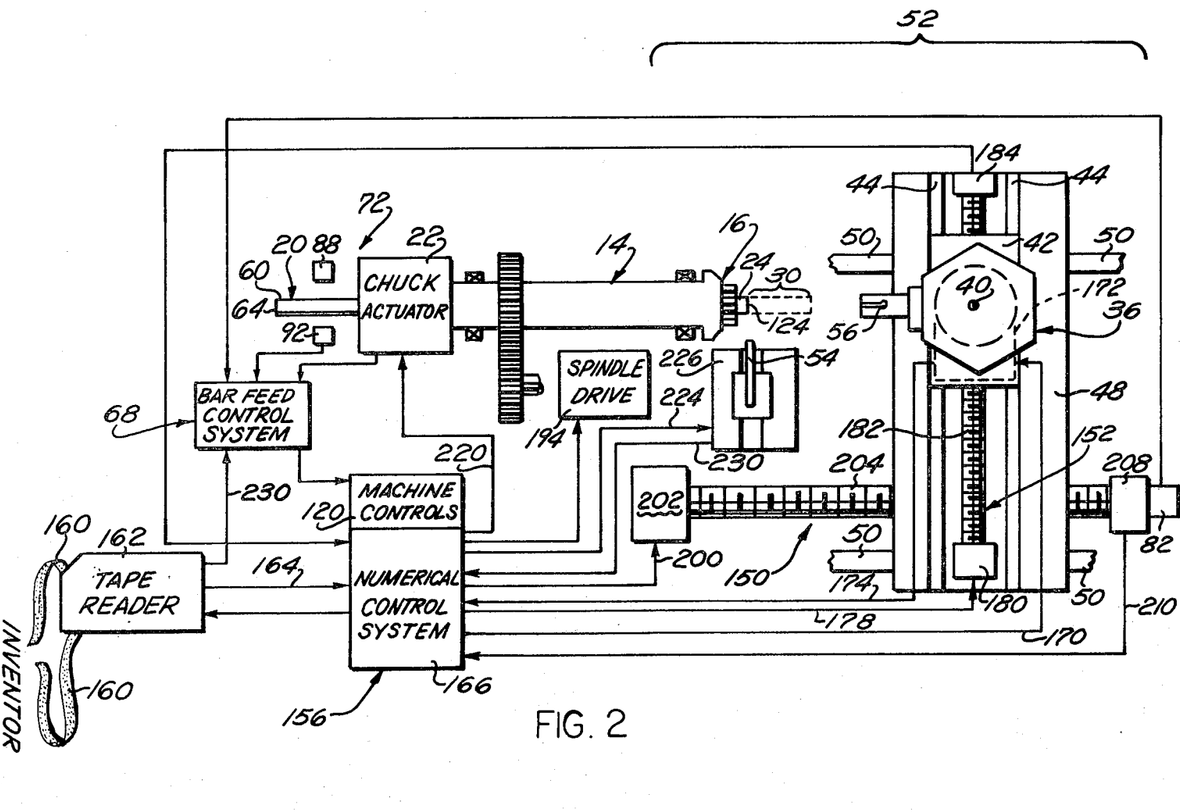
FIG. 2 is a highly schematicized illustration of the machine tool of FIG. 1 and depicting the relationship between a spindle assembly for rotating bar stock, a turret on which a bar stock feed gripper is mounted, and a numerical control system for controlling the feeding of bar stock.

At the end of a cycle of operation of the machine tool 10, the leading end portion of the bar stock 20 is severed from the remainder of the bar stock by operation of a cutoff tool 54 (FIG. 2). For purposes of clarity of illustration, the cutoff tool 54 has been omitted from FIG. 1. Operation of the cutoff tool 54 leaves a relatively short portion of the bar stock 20 extending from the chuck 16 into the work area 52, as shown in solid lines in FIG. 2.

When the next piece or part is to be machined from the bar stock 20, the leading end portion 24 of the bar stock must be fed to the work or machining station 30. To accomplish this, the relatively short leading end portion 24 of the bar stock is clampingly engaged by a bar stock gripper 56. The chuck 16 is then opened and a desired length of the bar stock 20 is pulled to the work station 30 by moving the gripper 56 through a feed stroke in a direction away from the chuck 16, that is toward the right as viewed in FIG. 2. When the desired length of bar stock 20 has been pulled to the work station 30, the feed stroke is interrupted and the chuck 16 is operated to the closed condition to hold the bar stock against further axial movement. The gripper 56 is then disengaged from the bar stock by continuing the movement of the gripper assembly in a direction away from the spindle assembly 14. The leading end portion 24 of the bar stock can then be machined by suitable operation of the machine tool 10.

Figure 3:
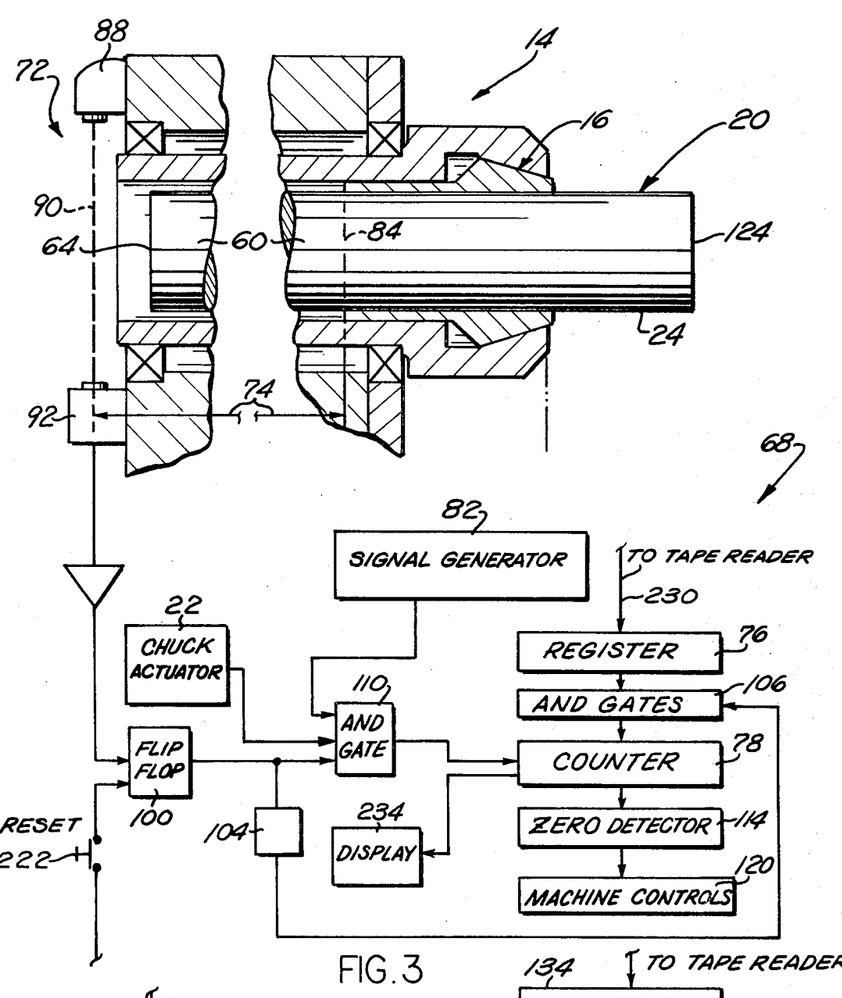
FIG. 3 is a schematic illustration further depicting the numerical control system for controlling the feeding of bar stock.

During continued operation of the machine tool 10, the feeding of bar stock 20 to the work station 30 is repeated on each cycle of operation. Of course, this repeated feeding of bar stock 20 to the work station 30 decreases the length of a trailing end portion 60 of the bar stock and the amount of bar stock available to be fed to the work station during subsequent operations of the machine tool 10. If the feeding operations are repeated enough times, a trailing end surface or face 64 of the bar stock 20 will move from a position spaced a substantial distance from the chuck 16 (FIG. 1) to a position relatively close to the chuck (FIG. 3). If this feeding of the bar stock is continued through additional feeding operations, the length of the trailing end portion 60 of bar stock will be reduced to zero as the end surface 64 enters the chuck 16. At this time the length of bar stock 20 remaining may not be sufficient to enable the chuck 16 to properly grip the bar stock during machining operations. Of course, still further feeding of the bar stock 20 could result in the trailing end 64 of the bar stock being pulled out of the chuck 16. To prevent overfeeding of the bar stock 20, a bar feed control system 68 (FIGS. 2 and 3) is provided for stopping the machine 10 when the trailing end portion 60 of the bar stock is shorter than a predetermined minimum length necessary for proper operation of the machine 10.

In the embodiment of the invention illustrated in FIG. 3, the bar feed control system 68 prevents overfeeding by interrupting the feeding of the bar stock 20 when the trailing end portion 60 of the bar stock has a length which is just slightly less than a predetermined length. To accomplish this, the bar feed control system 68 includes a bar end detector assembly 72 which detects when the trailing end surface 64 of the bar stock 20 is in a predetermined location. At this time the trailing end portion 60 of the bar stock 20 has a known length which is equal to the distance (designated 74 in FIG. 3) from the detector assembly 72 to a trailing or approach side of the chuck 16. Although it is contemplated that with different chuck designs the feeding of bar stock will be stopped with the trailing end surface 64 in different locations, in the illustrated embodiment of the invention the length of the trailing end portion 60 at any given time corresponds to the length of bar stock available for feeding at that time.

Coded data indicative of the predetermined length 74 of bar stock which is available for feeding when the trailing end surface 64 is sensed by the photoelectric detector assembly 72, is permanently stored in a register 76. This coded data is transmitted from the register 76 to a presettable counter 78 when the detector assembly 72 senses the trailing end surface 64 of the bar stock 20. Feeding of the bar stock to the work station 30 is then continued through a number of cycles of operation of the machine 10. Of course the number of operating cycles before the bar stock must be replenished will vary with variations in the length of the feed strokes through which the gripper 56 is moved and the length 74 of bar stock.

During continued feeding of the bar stock, a signal generator 82 provides pulse type signals which represent increments of bar stock 20 fed to the work station 30 and a corresponding reduction in the length of the trailing end portion 60 of the bar stock. These pulses are transmitted from the signal generator 82 to the counter 78. The pulses from the signal generator 82 are effective to count the counter 78 down to zero as the trailing end surface 64 of the bar stock 20 approaches the chuck 16. Thus, the counter 78 reaches zero when the trailing end surface 64 of the bar stock is at the position indicated by dashed lines at 84 in FIG. 3. Immediately after the counter 78 is counted down to zero, operations on the bar stock 20 are interrupted by stopping the machine 10. Stopping the machine 10 merely means that normal machining and feeding operations are stopped and it should be understood that some motors and other apparatus in the machine may be still running.

The detector assembly 72 senses when the trailing end surface 64 of the bar stock 20 is in a known location relative to the chuck 16 and the predetermined length 74 of bar stock is available for feeding to the work station 30. The detector assembly 72 may be of the photoelectric type which includes a light source or lamp 88 which transmits a beam of light along a path 90 to a photo cell 92 when the trailing end portion 60 of the bar stock 20 is moved out of the way. Thus, the photo cell 92 is activated by light from the lamp 88 when the trailing end surface 64 of the bar stock 60 is moved across the path 90 by a feeding of the bar stock 20 to the work station 30. At this time the trailing end portion 60 of the bar stock has the predetermined length indicated at 74 in FIG. 3. Although the length 74 may vary in different machines, it is contemplated that this length of bar stock will be sufficient to enable bar stock to be fed to the work station 30 for a plurality of operating cycles of the machine. It will also be apparent that other types of devices may be employed in detector assembly 72, for example a microswitch and a spring-biased feeler finger, to detect when the end surface 64 passes the predetermined location.

Coded data indicative of the length 74 of bar stock is stored in the register 76. When the trailing end surface 64 of the bar stock 20 crosses the path 90 this data is transmitted to the counter 78. Thus, activation of the photo cell 92 by a light beam from the lamp 88 results in the generation of a signal to actuate a bistable flip flop 100. Actuation of the flip flop 100 provides a signal which activates a pulse forming circuit 104 to send a pulse signal to AND gates 106. Upon receipt of this pulse signal the AND gates 106 transmit the coded data from the register 76 to the counter 78.

During subsequent feeding movement of the bar stock 20, the signal generator 82 sends pulse signals to an AND gate 110 which transmits the signals to effect a downward counting of the counter 78. When the counter 78 reaches zero, a zero detector 114 transmits a command signal to machine controls 120 to stop the operation of the machine 10 and thereby prevent further feeding of the bar stock with the trailing end surface 64 of the bar stock 20 substantially at the position indicated in dashed lines at 84 in FIG. 3. Thus, the feeding of the bar stock 20 is interrupted after the trailing end surface 64 has been moved through a predetermined distance from the path 90, that is the distance 74, by the feeding of bar stock to the work station 30. Therefore, the control system 68 renders the machine tool 10 ineffective to move bar stock 20 from the chuck 16 to the work station 30 in response to movement of the surface 64 from the path 90 through a distance which is slightly greater than the distance 74 to thereby prevent further feeding of the bar stock 20 to the work area when the length of the trailing end portion 60 is shorter than the distance from the dashed line 84 to the forward end of the chuck 16.

At the time when the feeding of bar stock 20 is interrupted by a stopping of the machine 10 by the bar feed control system 68, the bar stock has an overall length which is less than a predetermined minimum length of bar stock required for proper gripping by the chuck 16 during a machining of the section of bar stock at the work station 30. Therefore, the bar feed control system 68 prevents overfeeding of the bar stock 20 which could result in a machining operation being initiated when the bar stock has insufficient length to enable the chuck 16 to properly grip the bar stock. Of course, this also prevents the bar stock 20 from being pulled completely out of the chuck 16 by interrupting a feed stroke when the overall length of the bar stock is less than the length to be fed on that feed stroke.

When the desired length of bar stock has been fed to the work station 20, the pulling movement of the gripper 56 in a direction away from the spindle 14 is interrupted and the chuck 16 is closed. The gripper 56 is then disengaged from the leading end portion 24 of the bar stock by continuing the movement of the gripper 56 in a direction away from the spindle assembly 14. Since the bar stock 20 is held against axial movement by the now closed chuck 16, the gripper 56 is pulled off the leading end 24 of the bar stock by this continued movement of the gripper.

During movement of the gripper 56 away from the spindle 14 to disengage the gripper from the bar stock 20, the signal generator 82 continues to transmit pulses to the AND gate 110. If transmitted to the counter 78 by the AND gate 110, these pulses would cause an erroneous counting down of the counter as the gripper 56 is disengaged from the bar stock 20 with the trailing end surface 64 between the positions 90 and 84. This is because the bar stock 20 is being held against axial or feeding movement by the now closed chuck 16 and thus the pulses from the signal generator 82 would not be representative of an increment of feeding movement. Therefore, a conditioning signal is transmitted from the chuck actuator 22 to the AND gate 110 only when the chuck 16 is in the open condition and the pulses from the signal generator 82 represent an increment of feeding movement of the bar stock 20. When the chuck 16 is in the closed condition during disengagement of the gripper 56 and machining of the section of bar stock at the work station 30, the conditioning signal to the AND gate 110 is discontinued so that the AND gate is rendered ineffective to transmit signals to the counter 78 to count the counter down.

In the embodiment of the invention illustrated in FIG. 3, the feeding of the bar stock 20 is interrupted when the trailing end surface 64 of the bar stock is moved through the predetermined distance 74 by a plurality of feeding operations. Therefore, the feeding of bar stock 20 to the work station 30 may be interrupted part way through a feeding operation. This could occur since the distance 74 may not be equal to a whole number multiple of the length of the section of bar stock fed to the work station 30 during each feeding operation. Even if the distance 74 was adjusted to be a whole number multiple of the length of bar stock 20 fed on a given feeding operation, the trailing end surface 64 could cross the path 90 part way through a feeding operation.

When the feeding of bar stock 20 is interrupted part way through a feeding operation, an operator of the machine 10 has to disengage the bar stock from both the spindle assembly 14 and the gripper 56 in order to remove the remnant end portion of the bar stock from the machine 10. In the embodiment of the invention illustrated in FIG. 4, a bar feed control system 130 is operable to stop the operation of the machine upon initiation of a feeding operation when the length of the bar stock 20 available for feeding is less than the length of bar stock to be fed during this feeding operation. Therefore, the bar feed control system 130 interrupts the feeding of bar stock with the gripper 56 disengaged from the leading end portion 24 of the bar stock 20.

Figure 4:
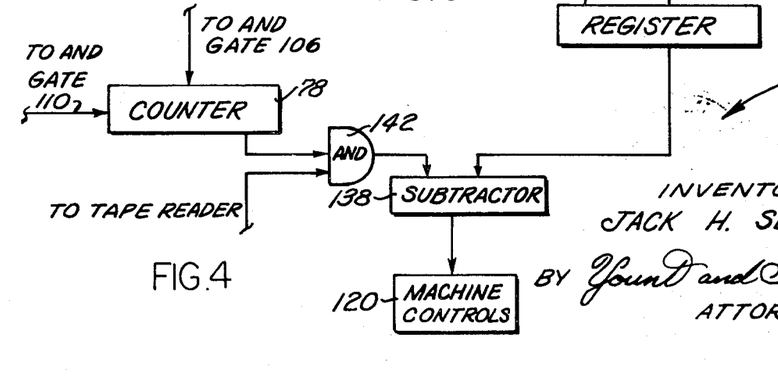
FIG. 4 is a fragmentary schematic illustration partially depicting a second embodiment of the numerical control system for controlling the feeding of bar stock.

The bar feed control system 130 is associated with a signal generator, photoelectric detector assembly, and spindle assembly in much the same manner as in which the bar feed control system 68 is associated with this apparatus. Therefore, for purposes of clarity of illustration and to avoid prolixity of description, the bar feed control system 130 will be described as being associated with the same apparatus as was associated with and included in the bar feed control system 68.

The bar stock feed control system 130 functions to compare the length of bar stock 20 available for feeding to the work station 30 with the length of bar stock to be fed on a feed stroke about to be initiated. If the length of the bar stock 20 available for feeding is less than the length of the bar stock to be fed on the next feeding operation, the bar feed control system 130 stops operation of the machine 10. Once the trailing end 64 of the bar stock 20 has been sensed by the detector assembly 72, the coded data in the counter 78 is indicative of the length of bar stock available for feeding. This is because the signals from the signal generator 82 count the counter 78 down by an amount corresponding to the length of bar stock fed after detection of the trailing end 64 by the detector assembly 72. The bar feed control system 130 includes a register 134 (FIG. 4) in which coded data indicative of the length of bar stock to be fed on the next feeding operation is stored. By comparing the data stored in the counter 78 with coded data stored in the register 134 it can readily be determined whether or not sufficient bar stock is available for the next feeding operation.

If the length of bar stock available for feeding and represented by the coded data in the counter 78 is greater than the length of bar stock to be fed on the next feeding operation and represented by the coded data in the register 134, the bar feed control system 130 allows the next feeding operation to be performed. If the length of bar stock to be fed and represented by the coded data in the register 134 is greater than the length of bar stock available and represented by the coded data in the counter 78, a subtractor 138 transmits a signal to the machine controls 120 to stop the operation of the machine 10. Thus, the bar feed control system 130 is operable in dependancy upon the data stored in the counter 78 and register 134 to prevent the undertaking of a feeding operation when there is insufficient bar stock available to complete this feeding operation. Therefore, the control system 130 renders the machine tool 10 ineffective to move bar stock from the chuck 16 to the work station 30 in response to movement of the surface 64 from the path 90 through a distance such that the length of bar stock represented by the coded data in the register 134 is greater than the distance through which the surface 64 would be moved on the next feeding operation to thereby prevent further feeding of bar stock to the work area 30 when the trailing end portion 60 of the bar stock is shorter than the length of bar stock to be fed during the next feeding operation.

It is contemplated that a machining operation may be performed while the length of bar stock available to be fed to the machining station 30 on the next feeding operation is less than the length of bar stock available to be fed to the machining station. Therefore, operation of the machine 10 is stopped upon initiation of the next feeding operation and after the section of bar stock at the work station 30 has been completely machined. Accordingly, upon initiation of a feeding operation, a pulse signal is sent to an AND gate 142 to condition the AND gate to transmit data from the counter 78 to the subtractor 138. This prevents data from being transmitted from the counter 78 to the subtractor 138 during either a feeding operation or a machining operation. Therefore, the subtractor 138 is ineffecient to interrupt any machining motion, but is effective to prevent initiation of a feed motion when insufficient bar stock remains.

The bar feed gripper 56 is advantageously mounted on the turret 36 so that a drive assembly of 150 (FIG. 2) for moving the saddle 48 along the bedways 50 and a drive assembly 152 for moving the cross slide 42 along the ways or tracks 44 can be utilized to accurately position and move both the tools 34 and the gripper 56 relative to the spindle assembly 14. In addition, mounting the gripper 56 on the turret 36 enables common numerical control circuitry 156 to be utilized to control movement of the gripper 56 relative to the spindle assembly 14 and to control movement of the tools 34 during machining of bar stock 20. However, it is contemplated that in certain machines it may be desirable to provide one assembly for moving the gripper 56 and another assembly for moving tools, similar to the tools 34, relative to the bar stock at the machining station 30. It is also contemplated that known manual controls could be utilized if desired.

The numerical control circuitry 156 is operable to effect movement of the turret 36 and gripper assembly 56 to pull a predetermined length of the bar stock 20 to the work station 30 and to effect movement of the tools 34 to operate on this predetermined length of bar stock. The control circuitry 156 operates the machine tool 10 through a plurality of cycles of operation in accordance with a predetermined program which is recorded on a punched tape 160. It is contemplated that the control circuitry 156 can take many different forms, such as that disclosed in application Ser. No. 45,478 filed on June 11, 1970 by Charles T. Blake and entitled Machine Tool and now U.S. Pat. No. 3,691,879. It is also contemplated that the control circuitry could be constructed as shown in U.S. Pat. No. 3,431,478 issued to J.W. Forrester et al. or as shown in U.S. Pat. No. 3,190,139 issued to E.S. Swanson.

At the beginning of a cycle of operation of the machine tool 10 with an adequate length of bar stock 20 available for feeding, a section of bar stock to be machined on that cycle is fed to the work station 30. At the start of this bar feeding operation, the turret 36 is operated to position the gripper 56 in axial alignment with the bar stock 20. To accomplish this, the turret is indexed in accordance with the data read from the tape 160 by a reader 162 and sent over a path 164 to a numerical control system 166. In response to this data, the numerical control system 166 sends control signals over a path 170 to a drive mechanism 172 on the cross slide 42. The drive mechanism 172 then rotates or indexes the turret 36 to the position illustrated in FIG. 2 in which the gripper 56 faces toward the spindle assembly 14. A feedback signal is sent along a path 174 to the numerical control system 166 upon the completion of this indexing operation.

The reader 162 thereupon reads the tape 160 and transmits command data to the numerical control system 166. This command data indicates the position of the turret 36 on the saddle 48 when a longitudinal axis of the gripper assembly 56 is aligned with the longitudinal axis of the bar stock 20. Upon receipt of this data, the numerical control system 166 sends a control signal over a path 178 to operate a servomotor 180 in the cross slide drive assembly 152. The servomotor 180 is operated in the proper direction to rotate a drive screw 182 and move the cross slide 42 to a position in which the gripper 56 is axially aligned with the spindle assembly 14 (FIG. 2). When a feedback signal from a signal generator 184 indicates that the cross slide has been moved the proper distance, operation of the servomotor 180 is interrupted.

Once the gripper 56 has been aligned with the bar stock 20, the gripper is moved toward the chuck 16 and into engagement with the relatively short end portion 24 of the bar stock 20. Accordingly, the reader 162 reads the tape 160 and transmits command data determinative of the displacement of the saddle 48 and turret 36 necessary to position the gripper 56 to grip the end portion 24 of the bar stock 20 (FIG. 4). If the bar feed control system 130 is utilized, data determinative of the length of bar stock to be fed to the machining position or work station 30 is read at this time from the tape 160 and transmitted to the register 134. If there is insufficient bar stock 20 available for feeding, the bar feed control system 130 will stop the machine 10.

Assuming that an adequate length of bar stock 20 is available for feeding, the numerical control system 156 transmits a control signal along a path or connection 200 to a servomotor 202 which rotates a drive screw 204 to move the saddle 48 along the bedways 50 toward the chuck 16. As the saddle 48 and gripper 56 are moved toward the chuck 16 by this operation of this drive assembly 150, feedback signals are transmitted from an encoder or signal generator 208 through a path or connection 210 to the numerical control system 166. These feedback signals represent numbers which are indicative of the instantaneous or existing displacement of the saddle 48 and turret 36 from a zero or reference position relative to the spindle assembly 14. When the gripper 56 has been pressed onto the leading end portion 24 of the bar stock 20 (FIG. 4), the feedback signal from the encoder 208 corresponds to the reference or command data in the numerical control system 166. The numerical control system 166 thereupon interrupts operation of the servomotor 202 to stop the movement of gripper 56 toward the chuck 16 and simultaneously therewith transmits a signal to the tape reader 162 to index the tape 160.

After the gripper 56 has engaged the leading end 24 of the bar stock 20, the chuck 16 is operated to the open condition and the gripper is moved away from the spindle assembly 14 to pull a predetermined length of the bar stock to the work or machining position 30. Accordingly, the next step on the tape 160 activates the reader 162 to send a command signal to the numerical control system 166 which in turn transmits signals over path 220 to the chuck actuator 22 to effect operation of the chuck 16 to the open condition. After a time delay sufficient to enable the chuck to open, the numerical control system 86 again activates the servomotor 202 to operate the drive assembly 150. However, this time the direction of operation of the drive assembly 150 is reversed to move the saddle 48 and turret 36 away from the spindle assembly 14 so that the gripper 56 pulls the leading end portion of the bar stock 20 to the machining position 30. When a length of bar stock determined by data stored on the tape 160 has been pulled to the machining position 30, a feedback signal from the signal generator or encoder 208 will correspond to the numerical data stored in the numerical control system 166 and operation of the servomotor 202 is interrupted.

When the foregoing bar feed operation is undertaken with a new piece of bar stock 20, the trailing end portion 60 of the bar stock is relatively long (FIG. 1) and extends between the lamp or light source 88 and photo cell 92 (FIG. 2). Therefore, the flip flop 100 remains in the unactuated condition and the AND gate 110 is not conditioned to pass pulses from the signal generator 82 to the counter 78 as a section of bar stock is being pulled to the work station 30. During continued operation of the machine 10, sections of bar stock are sequentially pulled to the work station 30, machined to a desired configuration, and severed from the main body of the bar stock by the cutoff tool 54. As the sections of bar stock are pulled to the work station 30, the length of the trailing end portion 60 of the bar stock is reduced until the trailing end surface 64 of the bar stock 20 is moved across the path 90 so that a light beam from the lamp 88 can strike the photo cell 92.

When the beam from the lamp 88 strikes the photo cell 92 the flip flop 100 is activated and an amplified signal is sent to the pulse forming circuit 104. In response to this signal, the pulse forming circuit 104 momentarily conditions the AND gates 106 to enable the coded data in the register 76 to be transmitted to the counter 78. Since the chuck 16 is in the open condition, a signal is also transmitted from the chuck actuator 22 to the AND gate 110.

As the feeding movement of the bar stock 20 is continued, the signals from the signal generator 82 are transmitted to the AND gate 110 and counter 78 to count the counter down toward the zero condition as bar stock is fed to the work station 30. The distance 74 may be sufficiently long so as to require several feeding operations to occur before the trailing end surface 64 of the bar stock reaches the position indicated in dash lines at 84 in FIG. 3 and the counter 78 is counted down to zero. When the trailing end surface 64 has reached the chuck 16 and the counter 78 has been counted down to zero, the zero detector 114 activates the machine controls 120 to stop the operation of the machine 10.

When the machine 10 is stopped due to a lack of available bar stock for feeding, the operator of the machine actuates the chuck 16 to the open condition, removes the relatively short remaining piece of bar stock, and inserts a new piece of bar stock. A reset switch 222 is then closed by the operator to reset the flip flop 100. The normal operation of the machine 10 is then resumed in a manner previously explained.

At the start of the next cycle of operation of the machine tool 10, the desired length of bar stock is pulled to the machining position 30. The chuck 16 is then operated to the closed position to hold the bar stock against further axial movement and the gripper 56 is disengaged from the bar stock by continuing the movement of the gripper away from the closed chuck. It should be noted that during this movement of the gripper 56, the chuck 16 is closed and the AND gate 110 is not conditioned to pass pulses from the signal generator 82. Therefore, the counter 78 is not counted down while the gripper 56 is being disengaged from the bar stock 20 and the bar stock is being held against axial movement by the chuck 16.

To effect disengagement of the gripper 56 from the bar stock 20, a suitable recordation on the tape 160 activates the reader 162 to send a command signal to the numerical control system 166. Upon receipt of this command signal, the numerical control system 166 sends a command signal over the path 220 to the chuck actuator 22 to effect operation of the chuck 16 to the closed condition. After the chuck 16 has been closed, the tape 160 is again stepped and command signals representing numerical data determinative of the position of the saddle 48 when the gripper 56 is spaced from the leading end of the bar stock 20 is transmitted to the numerical control system 166. Upon receipt of this command data, the numerical control system 166 activates the servomotor 202 to continue the movement of the turret 36 in a direction away from the spindle assembly 14. Since the chuck 16 is in the closed condition, the bar stock 20 is held against axial movement and the gripper clamping surfaces slide along the outer surfaces of the bar stock 20 until the gripper 56 is disengaged from the bar stock. When the gripper 56 is spaced the desired distance from the end of the bar stock, a feedback signal from the encoder 208 corresponds to the command or reference data stored in the numerical control system 166 and the servomotor 202 is deenergized.

The spindle drive assembly 194 is then activated to operate the spindle assembly 14 and turret 36 is indexed, in accordance with data on the tape 160, to move any one of the tools 34 to an operating position relative to the leading end portion of the bar stock 20. The saddle and cross slide drive assemblies 150 and 152 are also operated in accordance with the data recorded on the tape 160 to move the tools 34 into engagement with the length of bar stock in the machining position 30. From time to time during operation of the machine tool 10, the turret 36 will be indexed to bring other tools 34 into the working position and the turret will be moved axially and transversely relative to the bar stock 20 to perform the machining operations dictated by the program stored on the tape 160.

Toward the end of the cycle of operation of the machine tool 10, the cutoff tool 54 is moved into engagement with the rotating bar stock 20 to sever the machined section or part from the main portion of the bar stock. Accordingly, the tape 160 activates the tape reader 162 to transfer a command signal to the numerical control system 166 which in response thereto transmits a signal over a lead 224 to a drive mechanism 226 for the cutoff tool 54. Activation of the drive mechanism 226 moves the cutoff tool 54 into engagement with the bar stock 20 to sever the machined end portion from the bar stock. Upon completion of this cutting or severing, the cutoff tool 54 is retracted in response to a feedback signal transmitted over a path 230 to the numerical control system 166. In response to this feedback signal, the numerical control system 166 again activates the reader 162 to step the tape 160 to begin the next succeeding cycle of operation of the machine tool 10.

In the foregoing descriptions of specific preferred embodiments of the invention the length of bar stock necessary for proper gripping by the chuck 16 was considered as being a constant length. However, it is contemplated that with certain chucks, the length of bar stock necessary for proper gripping could vary with variations in the size and machining characteristics of the bar stock and the speed of operation of the machine tool 10.

To stop the machine tool 10 when the trailing end portion 60 of the bar stock 20 has different lengths, it is necessary to change the distance 74 through which the trailing end surface 64 of the bar stock is moved from the detector assembly 72 before the machine is stopped. This is accomplished by changing the data stored in the register 76. When it is desired to interrupt the feeding bar stock when the trailing end portion 60 of the bar stock is relatively long, it is merely necessary to change the data stored in the register 76 to represent a decreased distance 74. This causes the feeding of the bar stock 20 to be interrupted when the trailing end surface 64 is to the left of the position indicated by dashed lines at 84 in FIG. 3. Similarly, when it is desired to interrupt the feeding of the bar stock 20 when the trailing end portion 60 is relatively short, it is merely necessary to change the data stored in the register 76 to represent an increased distance 74. This causes the feeding of the bar stock to be interrupted when the trailing end surface 64 is to the right of the position indicated by dashed lines at 84 in FIG. 3.

The data stored in the register 76 can be changed either manually or in response to suitable data on the tape 160. When the data stored in the register 76 is to be changed in response to data on the tape 160, signals are sent over a path 230 to the register 76 from the tape reader 162. Since the tape 160 is stepped at least once for each cycle of operation of the machine tool 10, the data stored in the register 76 can be varied on each cycle of operation of the machine tool 10 if desired.

The signals from the signal generator 82 can be utilized to represent either relatively small or relatively large increments of axial movement of the bar stock 20 by the gripper 56. In fact, these increments of movement could be so large as to represent the distance through which the bar stock is moved on one feed stroke of the gripper 56. If the increments of movement corresponded to one feed stroke of the gripper 56, the number represented by the data stored in the counter 78 after the trailing end surface 64 has moved inwardly of the detector assembly 72 is indicative of the number of feeding operations which can be undertaken before the operation of the machine tool 10 is stopped by the bar feed control system 68.

A known type of display device 234 can be used to provide a visual readout of the data stored in the counter 78. The display device 234 enables an operator of the machine tool 10 to determine how much bar stock is still available for feeding after the trailing end surface 64 of the bar stock moves past the detector assembly 72. The visual readout on the display device 234 could be in terms of either a length of bar stock remaining to be fed or in terms of a number of operating cycles through which the remaining bar stock will enable the machine 10 to be operated.

From the foregoing remarks, it can be seen that the machine tool 10 includes a chuck 16 which holds the bar stock 20 with the leading end portion 24 extending into a work area 52 and a trailing end portion 60 extending away from the chuck. As the machine 10 is operated through a plurality of cycles, sections of the bar stock are sequentially fed to the work or machining station 30 by a pulling movement of the gripper 56. As these sections of bar stock are fed to the work station 30, the length of the trailing end portion of bar stock is gradually reduced until the trailing end surface 64 passes across the path 90 between the lamp 88 and photocell 92 of the detector 72. When this occurs, coded data indicative of the length of bar stock available for feeding to the work station 30, i.e., the length 74, is transmitted from the register 76 to the counter 78. Upon continued feeding movement of the bar stock 20 to the work station 30, the signal generator 82 provides signals which are indicative of the decrease in the length of bar stock available for feeding to the work station. These signals are utilized to count the counter 78 down toward zero. When the trailing end surface 64 of the bar stock 20 has just moved past the predetermined position 84, the counter 78 reaches zero and the machine controls 120 are actuated to stop the operation of the machine 10.

In the embodiment of the invention illustrated in FIG. 4, the bar feed control system 130 includes a register 76 which stores coded data indicative of the length of bar stock to be fed on the next succeeding feed stroke. The subtractor 138 is effective to actuate the machine controls 120 to interrupt operation of the machine when the coded data in the counter 78 indicates that the length of bar stock available for feeding to the work station 30 is less than the length of bar stock to be fed on the next succeeding feed stroke.

It will be apparent to those skilled in the numerical control arts that suitable modifications could be made to adapt the present invention for use with absolute positioning systems as well as with incremental positioning systems, wherein the signal generators 184 and 208 would comprise digital shaft encoders and digital registers would be used in conjunction with a digital subtractor to monitor remaining length of bar stock available for feeding and interrupt or prevent a feeding operation when the commanded length of bar feed exceeds the length of bar stock available for feeding.

Having described specific preferred embodiments of the invention, the following is claimed:

1. A machine operable through a plurality of cycles to operate on successive sections of a piece of bar stock with tools at a work station, said machine comprising chuck means for holding the piece of bar stock with a leading end portion extending tending from the chuck means toward the work station and a trailing end portion extending in a direction away from the work station, gripper means for gripping the piece of bar stock, means for moving said gripper means through a predetermined feed stroke on each of the cycles of operation of the machine to sequentially feed the sections of bar stock to the work station and effecting a corresponding decrease in the length of the trailing end portion of bar stock, signal generator means for generating signals indicative of movement of the bar stock through an associated distance relative to said chuck means, means responsive to said signals for determining the change in the length of the trailing end portion of bar stock as the sections of bar stock are fed to the work station by movement of said gripper means on successive cycles of operation of said machine, and means for interrupting operation of said machine when the trailing end portion of bar stock is shorter than a predetermined length.

2. A machine for operating upon bar stock with tools in a work area, said machine comprising chuck means for holding the bar stock, feed means for moving the bar stock relative to said chuck means to feed bar stock to the work area, and numerical control means for at least partially controlling the operation of said feed means to prevent overfeeding of bar stock to the work area, said numerical control means including data storage means for storing data which determines the length of bar stock fed to the work area and control means operating in dependancy upon the stored data and responsive to feeding of bar stock for interrupting operation of said feed means and feeding operations after a feeding of a length of bar stock determined by the stored data.

3. A machine as set forth in claim 2 wherein said control means includes signal generator means for generating signals for determining the extent of movement of a trailing end surface of the bar stock from a predetermined location, and means operable in response to said signals to render said feed means ineffective to move bar stock from said chuck means to the work area when a trailing end portion of the bar stock is shorter than a predetermined length.

4. A machine as set forth in claim 1 wherein said means responsive to said signals includes counter means for counting said signals, detector means for detecting when a trailing end surface of the bar stock is at a predetermined location, and means for rendering said counter means effective to count said signals in response to said detector means detecting that the trailing end surface of the bar stock is in the predetermined location, said means for interrupting operation of said machine including means operable to render said means for moving said gripper means ineffective to move bar stock from said chuck means in response to a counting by said counter means of a number of signals corresponding to a length which is shorter than said predetermined length.

5. A machine as set forth in claim 4 further including means for setting said counter means to count different numbers of said signals on different cycles of operation of said machine to thereby enable said predetermined length to be varied from one cycle of operation of said machine to the next.

6. A machine as set forth in claim 1 further including means for varying the length of the sections of bar stock fed to the work station on successive cycles of operation of the machine, and means for varying the length of said predetermined length of bar stock in accordance with variations in the length of the sections of bar stock fed to the work station.

7. A machine for operating on bar stock with tools in a work area, said machine comprising chuck means for holding the bar stock with a leading end portion of bar stock extending toward the work area and a trailing end portion of bar stock extending away from the work area, feed means for moving bar stock from said chuck means to the work area and thereby reducing the length of the trailing end portion of bar stock, said feed means includes gripper means for gripping the bar stock and means for moving said gripper means through predetermined feed strokes to feed predetermined lengths of bar stock from said chuck means to the work area, detector means for detecting when a trailing end surface of the bar stock is moved to a predetermined location relative to said chuck means by operation of said feed means to thereby detect when the trailing end portion of bar stock has a predetermined length, and control means for controlling the operation of said machine, said control means including first data storage means for storing first coded data representative of the length of the trailing end portion of bar stock at the end of said feed strokes, second data storage means for storing second coded data representative of the length of bar stock to be fed on the next feed stroke, and means for comparing said first and second stored coded data between each of the feed strokes and initiating a control function when said second stored coded data is representative of a greater length of bar stock than said first stored coded data.

8. A machine as set forth in claim 7 wherein said control means further includes means for enabling said second stored coded data to be varied on successive cycles of operation of said machine.

9. A machine for operating on bar stock with tools in a work area, said machine comprising chuck means for holding the bar stock with a leading end portion of bar stock extending toward the work area and a trailing end portion of bar stock extending away from the work area, feed means for moving bar stock from said chuck means to the work area and thereby reducing the length of the trailing end portion of bar stock, detector means for detecting when a trailing end surface of the bar stock is moved to a predetermined location relative to said chuck means by operation of said feed means, and control means initiating a control function in response to movement of said trailing end surface of the bar stock from said predetermined location through a predetermined distance, said control means including signal generator means for generating signals indicative of movement of the bar stock through an associated distance relative to said chuck means by said feed means, counter means for counting said signals, means for rendering said counter means effective to count said signals in response to said detector means detecting that the trailing end surface of the bar stock is in the predetermined location, and means for initiating said control function in response to a counting by said counter means of a number of signals corresponding to said predetermined distance.

10. A machine as set forth in claim 9 wherein said detector means includes photoelectric means mounted on one side of said chuck means for detecting the trailing end surface of the bar stock at said predetermined location.

11. A machine as set forth in claim 10 wherein said feed means includes a bar stock gripping device for engaging the bar stock adjacent to another side of said chuck means opposite from said one side, and means for supporting said bar stock gripping device for movement engage and grip the bar stock adjacent said other side of said chuck means and for movement away from said other side of said chuck means to pull bar stock from said chuck means to the work area.

12. A machine as set forth in claim 1 wherein said feed means includes gripper means for gripping the bar stock and means for moving said gripper means through a plurality of feed strokes of predetermined length to feed bar stock to the work area during operation of said machine, said data storage means including first means for storing data in accordance with the length of bar stock available for feeding at the end of a feed stroke, second means for storing data in accordance with the length of bar stock to be fed on a next suceeding feed stroke, said control means being effective to interrupt operation of said feed means in response to data stored in said first and second means when the length of bar stock available for feeding is less than the length of bar stock to be fed on a next succeeding feed stroke.

13. A machine as set forth in claim 1 wherein said data storage means for storing data includes counter means for registering data indicative of the length of bar stock available to be fed to the work area.

14. A machine for operating upon bar stock with tools in a work area, said machine comprising chuck means for holding the bar stock with a leading end portion extending into the work area and a trailing end portion extending in a direction away from the work area, feed means for moving the bar stock relative to said chuck means to feed bar stock into the work area, and numerical control means for at least partially controlling the operation of said feed means, said numerical control means including means for storing coded data, means for transmitting first coded data which relates to an initial length of the trailing end portion of the bar stock to said means for storing coded data and means for transmitting second coded data which relates to changes in the length of the trailing end portion of the bar stock to said means for storing coded data, and means for interrupting operation of said feed means when the second coded data is a predetermined function of the first coded data.

15. A machine as set forth in claim 14 wherein said feed means includes gripper means for gripping the bar stock and means for moving said gripper means relative to said chuck means to feed the bar stock to the work area, said means for transmitting second coded data including signal generator means for generating signals in response to movement of said gripper means and in accordance with changes in the length of the trailing end portion of the bar stock from said initial length.

16. A machine for operating on bar stock with tools located in a work area, said machine comprising chuck means for holding bar stock in a position in which a leading end portion of the bar stock extends from said chuck means into the work area and a trailing end portion of the bar stock extends from said chuck means in a direction away from the work area, said chuck means being operable between a closed condition holding the bar stock against movement relative to said chuck means and an open condition in which the bar stock is movable relative to said chuck means, actuator means for effecting operation of said chuck means between the open condition and the closed condition, gripper means for gripping the leading end portion of the bar stock in the work area, means for moving said gripper means away from said chuck means to pull bar stock from said chuck means into the work area when said chuck means has been operated to the open condition to thereby increase the length of the leading end portion of the bar stock and effect a corresponding decrease in the length of the trailing end portion of the bar stock, and control means for automatically interrupting operation of said means for moving said gripper means when the length of the trailing end portion of the bar stock in less than a predetermined length, said control means including signal generator means for generating signals for determining the decrease in the length of the trailing end portion of the bar stock as bar stock is pulled from said chuck means into the work area by the movement of said gripper means, and means for rendering said control means nonresponsive to signals from said signal generator means when said chuck means is in the closed condition holding the bar stock against movement relative to said chuck means.

11. A machine for operating on bar stock with tools located in a work area, said machine comprising chuck means for holding bar stock in a position in which a leading end portion of the bar stock extends from said chuck means into the work area and a trailing end portion of the bar stock extends from said chuck means in a direction away from the work area, said chuck means being operable between a closed condition holding the bar stock against movement relative to said chuck means and an open condition in which the bar stock is movable relative to said chuck means, actuator means for effecting operation of said chuck means between the open condition and the closed condition, gripper means for gripping the leading end portion of the bar stock in the work area, means for moving said gripper means away from said chuck means to pull bar stock from said chuck means into the work area when said chuck means has been operated to the open condition to thereby increase the length of the leading end portion of the bar stock and effect a corresponding decrease in the length of the trailing end portion of the bar stock, and control means for automatically interrupting operation of said means for moving said gripper means when the length of the trailing end portion of the bar stock in less than a predetermined length, said control means including signal generator means for generating signals for determining the decrease in the length of the trailing end portion of bar stock as bar stock is pulled into the work area by the movement of said gripper means, said means for moving said gripper means being operable to disengage said gripper means from the leading end portion of the bar stock by continuing the movement of said gripper means in a direction away from said chuck means after a desired length of bar stock has been pulled from said chuck means into the work area and said actuator means has operated said chuck means to the closed condition, said signal generator means being operable to generate signals during the continued movement of said gripper means to disengage said gripper means from the bar stock, and said control means further including means for rendering said control means nonresponsive to signals from said signal generator means during the continued movement of said gripper means in effecting disengagement of said gripper means from the leading end portion of the bar stock.

18. A machine as set forth in claim 16 wherein said control means includes detector means for detecting when a trailing end surface of the bar stock is in a predetermined location relative to said chuck means.

19. A machine as set forth in claim 18 wherein said control means further includes means for interrupting operation of said means for moving said gripper means in response to movement of the bar stock through a predetermined distance relative to said chuck means after said detector means detects that the trailing end surface of the bar stock is in the predetermined location.

20. A machine as set forth in claim 17 wherein said means for moving said gripper means includes turret means for supporting said gripper means and tools for operating on the leading end portion of the bar stock, said machine further comprising drive means for moving said turret means and said gripper means away from said chuck means to pull bar stock from said chuck means when said gripper means is gripping the leading end portion of the bar stock.

21. A machine as set forth in claim 20 wherein said turret means includes indexing means for rotating said turret means to position said gripper means and tools on said turret means relative to the leading end portion of the bar stock.

22. A machine for operating on bar stock with tools located in a work area, said machine comprising chuck means for holding bar stock in a position in which a leading end portion of the bar stock extends from said chuck means into the work area and a trailing end portion of the bar stock extends from said chuck means in a direction away from the work area, said chuck means being operable between a closed condition holding the bar stock against movement relative to said chuck means and an open condition in which the bar stock is movable relative to said chuck means, actuator means for effecting operation of said chuck means between the open condition and the closed condition, gripper means for gripping the leading end portion of the bar stock in the work area, means for moving said gripper means away from said chuck means to pull bar stock from said chuck means into the work area when said chuck means has been operated to the open condition to thereby increase the length of the leading end portion of the bar stock and effect a corresponding decrease in the length of the trailing end portion of the bar stock, and control means for controlling the operation of said machine, said control means including means for determining when the trailing end portion of the bar stock has a predetermined length, signal generator means for generating signals as bar stock is pulled into the work area by the movement of said gripper means, means responsive to said signals for determining the decrease in length of the trailing end portion of the bar stock from the predetermined length during a pulling of the bar stock into the work area with said gripper means, said means for moving said gripper means being operable to disengage said gripper means from the leading end portion of the bar stock by continuing the movement of said gripper means in a direction away from said chuck means after a desired length of bar stock has been pulled from said chuck means into the work area and said actuator means has operated said chuck means to the closed condition, said signal generator means being operable to generate signals during the continued movement of said gripper means to disengage said gripper means from the bar stock, and said control means further including means for rendering said control means nonresponsive to signals from said signal generator means during the continued movement of said gripper means in effecting disengagement of said gripper means from the leading end portion of the bar stock.

23. A machine operable through a plurality of cycles to operate on successive sections of a piece of bar stock with tools at a work station, said machine comprising chuck means for holding the piece of bar stock with a leading end portion extending from the chuck means toward the work station and a trailing end portion extending in a direction away from the work station, gripper means for gripping the piece of bar stock, means for moving said gripper means through a predetermined feed stroke on each of the cycles of operation of the machine to sequentially feed the sections of bar stock to the work station and effecting a corresponding decrease in the length of the trailing end portion of bar stock, signal generator means for generating signals for determining the change in the length of the trailing end portion of bar stock as the sections of bar stock are fed to the work station by movement of said gripper means on successive cycles of operation of said machine, and control means for stopping operation of said machine in response to one of the signals when the trailing end portion of bar stock is shorter than a predetermined length, said control means including means for storing data indicative of the length of the trailing end portion of bar stock remaining after a feeding of each section of bar stock in turn to the work station, means for comparing said predetermined length of the trailing end portion of bar stock with the remaining length of the trailing end portion of bar stock after each section of bar stock is fed to the work station, and means for interrupting operation of said machine when the length of the trailing end portion of bar stock remaining after a feeding of one of the sections of bar stock to the work station is less than said predetermined length of bar stock.

24. A machine as set forth in claim 23 further including means for varying the length of the sections of bar stock fed to the work station on successive cycles of operation of the machine, said control means including means for varying the length of said predetermined length of bar stock in accordance with variations in the length of the sections of bar stock fed to the work station.

25. A machine as set forth in claim 23 wherein said means for moving said gripper means through a predetermined feed stroke includes means for moving said gripper means in a direction away from said chuck means to thereby pull a section of bar stock to the work station.

26. A method of operating a machine for working on bar stock with tools located in a work area, said method comprising the steps of holding the bar stock in a chuck with a leading end portion of the bar stock extending into the work area and a trailing end portion of the bar stock extending from the chuck in a direction away from the work area, gripping the bar stock with a gripper while the bar stock is being held by the chuck, feeding bar stock to the work area by moving the gripper and bar stock relative to the chuck, generating a plurality of signals during movement of the gripper and bar stock relative to the chuck, determining changes in the length of the trailing end portion of the bar stock in response to said signals during movement of the gripper and bar stock relative to the chuck, and stopping the feeding of bar stock in response to one of the signals when the length of the trailing end portion of the bar stock is less than a predetermined length.

27. A method as set forth in claim 26 further including the method step of providing numerical data related to the length of the trailing end portion of the bar stock, said step of stopping the feeding of bar stock being performed when the stored numerical data corresponds to a length of bar stock which is shorter than a predetermined length.

28. A method as set forth in claim 26 wherein said step of gripping the bar stock with a gripper includes the step of gripping the leading end portion of the bar stock adjacent to one side of the chuck and said step of feeding bar stock includes the step of pulling bar stock from the chuck by moving the gripper away from the one side of the chuck.

29. A method of operating a machine for working on bar stock with tools located in a work area, said method comprising the steps of providing coded data which determines the length of a piece of bar stock available to be fed to the work area, feeding said piece of bar stock to the work area, and stopping said feeding step and preventing further feeding operations on said piece of bar stock in response to a feeding of a length of bar stock determined by the coded data.

30. A method as set forth in claim 29 wherein said step of feeding said piece of bar stock to the work area includes the method steps of engaging said piece of bar stock with a gripper and moving the gripper through a plurality of feed strokes to feed said piece of bar stock to the work area, said step of providing coded data including the method steps of providing first coded data indicative of the length of said piece of bar stock available to be fed at the end of a feed stroke, providing second coded data indicative of the length of said piece of bar stock to be fed on the next succeeding feed stroke, and determining the relationship between said first and second coded data, said step of stopping said feeding step being performed when the relationship between said first and second coded indicates that the length of said piece of bar stock available to be fed is less than the length of bar stock to be fed on the next succeeding feed stroke.

* * * * *

UNITED STATES PATENT OFFICE
CERTIFICATE OF CORRECTION

Patent No. 3,703,112                    Dated November 21, 1972

Inventor(s) Jack H. Selby

It is certified that error appears in the above-identified patent and that said Letters Patent are hereby corrected as shown below:

In the Claims

Column 16, line 62 after "-ment" insert --to--.

Column 18, line 16, change "11" to --17--.

Signed and sealed this 1st day of May 1973.

(SEAL)
Attest:

EDWARD M. FLETCHER, JR.            ROBERT GOTTSCHALK
Attesting Officer                  Commissioner of Patents